July 25, 1933.  E. A. BOHLMAN  1,919,767
BRACKET
Filed July 25, 1930
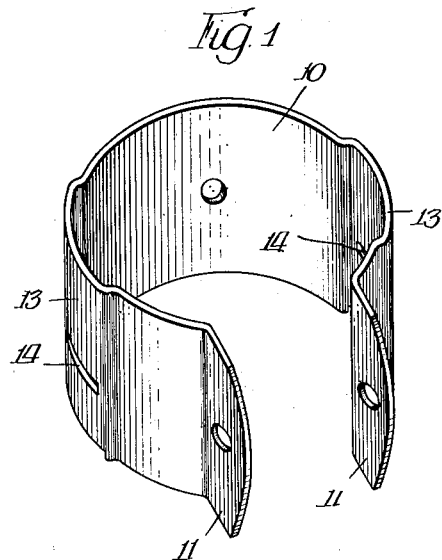
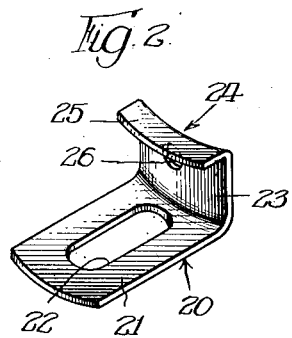
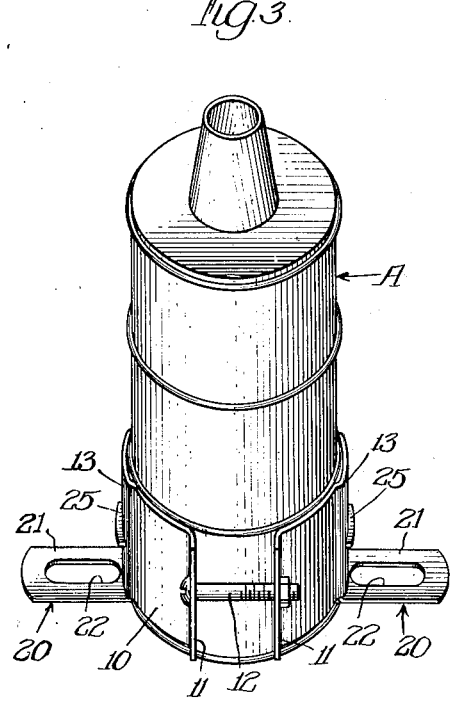
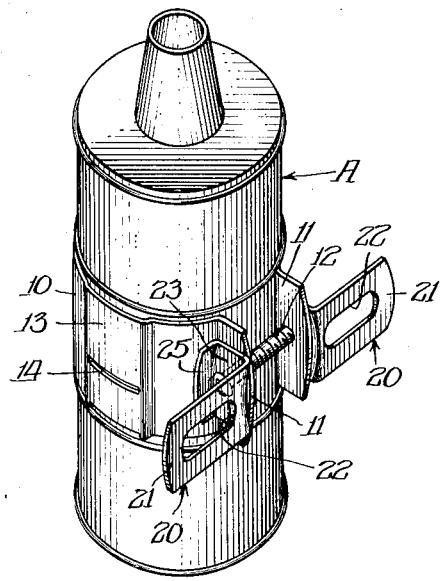
Inventor
Ernest A. Bohlman, Patented July 25, 1933

1,919,767

UNITED STATES PATENT OFFICE

ERNEST A. BOHLMAN, OF CHICAGO, ILLINOIS, ASSIGNOR TO JEFFERSON ELECTRIC COMPANY, OF CHICAGO, ILLINOIS, A CORPORATION OF ILLINOIS

BRACKET

Application filed July 25, 1930. Serial No. 470,569.

The invention relates generally to mounting devices and more particularly to a bracket for mounting a cylindrical object such as a transformer coil or the like.

The general object of the invention is to provide a novel bracket constructed to support a coil or the like in different positions, and which is inexpensive to manufacture and may be readily adjusted to a given position.

More specifically, the object is to provide such a bracket having a clamp for the coil and means attached to the clamp in different positions so that the coil may be securely supported with its axis either parallel or perpendicular to the supporting surface.

Other objects and advantages will become apparent from the following description taken in connection with the accompanying drawing, in which:

Figs. 1 and 2 are perspective views of the clamp and attaching means respectively of a bracket embodying the features of the invention.

Figs. 3 and 4 are perspective views showing the bracket supporting a coil in different positions.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The present embodiment of the invention comprises briefly a clamp for gripping a transformer coil or the like, and means secured to the clamp in different positions so that the coil may be firmly secured to a surface with its axis either parallel or perpendicular to the surface.

As shown in the drawing, the clamp comprises a band of metal 10 arranged to surround a coil generally indicated at A. The particular coil illustrated is a transformer coil for an automobile ignition system which may be mounted on any suitable part of the automobile with its axis either parallel or perpendicular to the surface on which it is supported, but it will be obvious that the bracket may be employed to support any similar cylindrical object.

The band 10 has its ends 11 bent outwardly from the coil with holes punched therein for receiving a screw 12 by which the ends 11 may be drawn toward each other to draw the band tightly around the coil.

For mounting the coil with its axis perpendicular to the surface upon which it is to be supported, the band 10 has a pair of diametrically opposite portions 13 which are offset outwardly from the band. A pair of slots 14 are punched in the respective offset portions 13 and extend transversely of the axis of the coil.

Means for securing the clamp to the surface is provided which, in the present instance, comprises a pair of arms each generally indicated at 20. Each arm is formed of a strip of metal comprising a first portion 21 having an elongated slot 22 punched therein and arranged to receive a screw (not shown) or the like for adjustably fastening the arm to the surface supporting the coil. The strip is bent to form a second portion 23 at a right angle to the first portion 21 and curved, as indicated at 24, to match the curvature of the coil.

For the perpendicular mounting of the coil, the second portion 23 extends between the offset portion 13 of the band and the coil, the amount of offset of the portion being substantially equal to the thickness of metal from which the arm is formed. On the end of the second portion 23, a tongue 25 is formed at a right angle to the second portion 23, the tongue extending into the slot 14 in the offset portion 13 of the band. Thus when the arms are placed within the offset portions of the band with the tongues in the slot and the band is drawn tightly around the coil, the arms are firmly attached to the band with the first portion of each arm lying in a plane transverse to the axis of the coil.

When the arms and band are thus assembled, the coil is supported with its axis perpendicular to the surface upon which it is mounted, as shown in Fig. 3. In that figure, the bracket is attached to the coil near the base thereof so that the base lies substantially on the supporting surface. If it is desired to support the coil in a position in which it extends through the supporting surface, it is obvious that the band may be shifted along the coil and clamped thereto at any position between the ends of the coil. Such a position of mounting a coil is sometimes met in practice when it is desired to have only a portion of the coil extending through the dash-board of an automobile.

For mounting the coil with its axis parallel to the supporting surface (see Fig. 4), the second portions 23 of the arms are secured against the respective outer faces of the ends 11 of the band by means of the screw 12 which holds the ends 11 together, a hole 26 being punched in the second portion 23 to receive the screw. With the second portion 23 in this position relative to the band, the tongue 25 serves as a lug abutting against the band proper to prevent rotation of the arm relative to the band. Thus, when the arms are secured to the supporting surface, the axis of the coil will be parallel to the supporting surface.

From the above description, it is evident that I have provided a novel bracket for securing a coil or the like to a surface with its axis either parallel or perpendicular to the surface. It is also evident that the bracket may be inexpensively manufactured and may be readily adjusted to support the coil in either of the above-mentioned positions.

I claim as my invention:

1. A bracket for securing a transformer coil or the like to a surface comprising, in combination, a clamp for gripping the coil comprising a band of metal and means for securing the ends of said band together, and a pair of arms constructed to be secured to said surface and having portions adapted to be selectively secured to intermediate portions of said band or to the ends thereof.

2. A bracket for securing a transformer coil or the like to a surface comprising, in combination, a clamp for gripping the coil comprising a band of metal and means for securing the ends of said band together, and a pair of arms each comprising a strip of metal having a first portion constructed to be secured to said surface and a second portion bent at right angles to said first portion and adapted to be secured to said band in any one of a plurality of relationships.

3. A bracket for securing a transformer coil or the like to a surface comprising, in combination, a clamp for gripping the coil comprising a band of metal arranged to surround the coil and having a pair of diametrically opposite slots punched therein, and means for securing the ends of said band together, and a pair of arms each comprising a strip of metal having a first portion constructed to be secured to said surface, and a second portion bent at a right angle to said first portion and clamped between the band and coil, said second portion having a tongue formed on its end extending into one of said slots in the band.

4. A bracket for securing a transformer coil or the like to a surface comprising, in combination, a clamp for gripping the coil comprising a band of metal arranged to surround the coil and having a pair of diametrically opposite portions offset outwardly with a pair of slots punched in the respective offset portions, and means for securing the ends of said band together, and a pair of arms each formed of a strip of metal comprising a first portion having a slot therein arranged to receive a screw or the like for fastening the arm to the surface, and a second portion bent at a right angle to said first portion and curved to match the curvature of the coil, said second portion extending between the coil and the band in the offset portion thereof and having a tongue formed on its end extending into the slot in the offset portion of the band.

5. A bracket for securing a transformer coil or the like to a surface comprising, in combination, a clamp for gripping the coil comprising a band of metal arranged to surround the coil and a screw securing the ends of said band together, and a pair of arms each comprising a strip of metal having a first portion constructed to be secured to said surface and lying in a plane parallel to the axis of the coil, and a second portion secured to one end of said band by said screw, said second portion having a lug angularly disposed relative to said second portion and abutting against said band to prevent relative rotation therebetween.

6. A bracket for securing an elongated object to a supporting surface comprising, in combination, a clamp for gripping the object comprising a band of metal arranged to surround the object and having its ends projecting outwardly therefrom, a bolt projecting through said ends to tighten said band about said object, and an arm for supporting said band having a first portion constructed to be fastened to said supporting surface, and a second portion bent at right angles to said first portion and adapted to be clamped between said object and said band to support the object with its axis perpendicular to the surface, said second portion being apertured to receive said bolt whereby said arm may be secured to one end of said band by said bolt to support the object with its axis parallel to the surface.

7. A bracket for securing an elongated object to a supporting surface comprising, in combination, a clamp for gripping the object comprising a band arranged to surround said object and having its ends projecting outwardly therefrom, a bolt projecting through said ends to tighten the band, and an arm having a first portion constructed to be secured to the surface and a second portion bent at right angles and having an aperture whereby it is secured to an outwardly projecting end of said band by said bolt, said aperture being spaced from the end edge of said second portion to permit abutment of said edge with the band proper, to non-rotatably support said object parallel to the surface.

8. A bracket for securing a transformer coil or the like to a surface comprising, in combination, a substantially circular band of metal adapted to surround the coil having a pair of diametrically opposite portions intermediate its ends spaced outwardly from the coil and having its ends projecting outwardly, and a bolt projecting through said ends to tighten said band around the coil, said spaced portions and said ends being adapted to be selectively attached to arms having portions extending perpendicularly for attachment to the surface.

9. A bracket for securing a transformer coil or the like to a surface with its axis perpendicular thereto comprising, in combination, a substantially circular band of metal adapted to surround the coil and having its ends bent to extend outwardly therefrom and spaced from one another, a bolt projecting through said ends for drawing said ends toward each other to tighten said band around the coil, said band having a long arcuate portion disposed diametrically opposite to the space between said ends and having two relatively short arcuate portions immediately adjacent said ends, all of said portions being adapted to be drawn into snug direct contact with the coil by said bolt, said band further having two diametrically opposed arcuate portions which are offset outwardly along lines extending transversely of the band, said last portions being located between said long arcuate portion and the respective short arcuate portions of said band, and a pair of arms each comprising a part adapted to be secured to said supporting surface and a second part extending at an angle to the first-mentioned part and dimensioned to be received within the recess in said band created by one of said offset arcuate portions and to be clamped between said offset portion and the coil by the operation of tightening said bolt.

ERNEST A. BOHLMAN.